United States Patent [19]

Hasegawa et al.

[11] Patent Number: 5,415,808
[45] Date of Patent: May 16, 1995

[54] FLOCCULANT FOR WATER TREATMENT

[75] Inventors: Takao Hasegawa, Toda; Takuya Onitsuka, Sagamihara; Yasuhiro Ehara, Tokyo; Katsuhiro Hashimoto, Yamato; Hiroshi Akazawa, Kawasaki, all of Japan

[73] Assignee: Suido Kiko Kabushiki Kaisha, Tokyo, Japan

[21] Appl. No.: 51,322

[22] Filed: Apr. 23, 1993

Related U.S. Application Data

[63] Continuation of Ser. No. 767,318, Sep. 30, 1991, Pat. No. 5,227,089.

[30] Foreign Application Priority Data

Oct. 1, 1990 [JP] Japan .................. 2-260591

[51] Int. Cl.⁶ ............................... C02F 5/10
[52] U.S. Cl. .................. 252/181; 252/180; 252/313.2; 210/724; 210/716
[58] Field of Search ............ 252/180, 181, 313.6; 210/724, 723, 716

[56] References Cited

U.S. PATENT DOCUMENTS

| | | | |
|---|---|---|---|
| 2,217,466 | 10/1940 | Baylis | 210/23 |
| 3,630,954 | 12/1971 | Yates | 252/313.2 |
| 3,867,304 | 2/1975 | Mindick et al. | 252/313.1 |
| 3,947,376 | 3/1976 | Albrecht | 252/313.2 |
| 4,110,212 | 8/1978 | Krofchak | 210/724 |
| 4,332,693 | 6/1982 | Piepho | 252/181 |
| 4,404,105 | 9/1982 | Lockerente et al. | 210/710 |
| 4,539,230 | 11/1985 | Shimizu et al. | 252/181 |
| 4,915,467 | 11/1983 | Piepho | 252/181 |
| 4,923,629 | 5/1990 | Hasegawa et al. | 252/181 |

FOREIGN PATENT DOCUMENTS

| | | |
|---|---|---|
| 0340353 | 11/1989 | European Pat. Off. . |
| 2555980 | 6/1985 | France . |
| 159539 | 3/1983 | German Dem. Rep. . |
| 542934 | 1/1932 | Germany . |
| 971180 | 12/1958 | Germany . |
| 285112 | 11/1988 | Japan . |
| 618895 | 3/1949 | United Kingdom . |
| 1399598 | 7/1975 | United Kingdom . |

OTHER PUBLICATIONS

Chemical Abstract 79(18):107904f; Barni, A.

Primary Examiner—Stephen Kalafut
Assistant Examiner—James M. Silbermann
Attorney, Agent, or Firm—Armstrong, Westerman, Hattori, McLeland & Naughton

[57] ABSTRACT

A flocculant for water treatment containing a highly polymerized silicic acid solution having a high concentration of $SiO_2$ and an extremely low concentration of alkali metal substance, and a method for producing such flocculant. The silicic acid solution is prepared by treating an aqueous solution of an alkali metal silicate such as water glass to remove alkali metal and allowing the solution to liquefy after once gelling. The flocculant may further contain a water soluble metal salt such as ferric chloride or ferric nitrate.

2 Claims, No Drawings

FLOCCULANT FOR WATER TREATMENT

This is a continuation of application Ser. No. 767,318 filed Sep. 30, 1991, now U.S. Pat. No. 5,221,089.

BACKGROUND OF THE INVENTION

1. Field of the Invention

This invention relates to a flocculant for water treatment to remove impurities from water and, particularly, to a flocculant containing a polymerized silicic acid solution. The invention relates also to a method for producing the flocculant.

2. Prior Art

It is widely known to use activated silica as a component of a flocculant for water treatment to purify water by removing impurities therefrom. Such activated or polymerized silica, however, has been used as a mere additive to a main flocculant consisting of a metal salt such as aluminum chloride or aluminum sulphate.

Recently, it has been proposed to use a solution of highly polymerized silicic acid as a flocculant for water treatment. For instance, U.S. Pat. No. 4,923,629 discloses a flocculant which comprises a solution containing a highly polymerized silicic acid and a small amount of a metal salt.

One problem of a flocculant comprising a solution of highly polymerized silicic acid is how to increase the concentration of effective components (silicic acid and metal substance) in the solution. Namely, the higher the concentration of effective components in the flocculant solution, the greater the capability of the flocculant for coagulating impurities in water. Moreover, the cost of transporting the flocculant solution can be reduced, because the solution can be stored and transported in a more condensed form. From a practical standpoint, it is desirable for the concentration of $SiO_2$ in the flocculant solution to be not less than about 8% (by weight) and the concentration of all effective components ($SiO_2 + MeO_x$) to be not less than 10% (by weight).

It is also well known, however, that the higher the concentration of $SiO_2$ in a solution of silicic acid, the easier it is for the solution to gel. A gelled solution naturally cannot be used as a flocculant. Therefore, it has not been practiced to use a silicic acid solution in which the concentration of $SiO_2$ exceeds about 8%. This is a contradictory problem in using a flocculant comprising a silicic acid solution.

SUMMARY OF THE INVENTION

An object of the invention is to provide a flocculant for water treatment which comprises a solution of highly polymerized silicic acid having a high concentration of $SiO_2$ and other effective components and which has a high capability of coagulating impurities in water and can be safely transported and stored for a long time without gelling. It is also an object to provide a method for producing such a flocculant.

According to the invention, a solution of highly polymerized silicic acid which has been subjected to a treatment to remove alkali metals and in which the concentration of alkali metal has been reduced to an extremely low degree, is used. Activated silica or highly polymerized silicic acid is usually produced from a silicate compound of an alkali metal, such as sodium silicate or potassium silicate, by reacting it with a compound such as sulfuric acid or carbon dioxide. Through neutralization with the sulfuric acid or the carbon dioxide, a water soluble salt such as $Na_2SO_4$ or $NaHCO_3$ is produced and the alkalinity of the solution due to alkali metal substances in the raw material is reduced. Notwithstanding the reduction of alkalinity, however, the concentration of alkali metal in the solution is not reduced, since an alkali metal salt is still present in the solution in a dissociated form.

The inventors have found that a solution of highly polymerized silicic acid, which is subjected to a treatment to remove alkali metals and in which the concentration of alkali metal substance is greatly reduced, does not gel for a surprisingly long time even if the concentration of $SiO_2$ or other effective substances in the solution is high. Namely, a solution of highly polymerized silicic acid in which the concentration of alkali metal has been extremely lowered can be used as a flocculant which has both high coagulating capability and high stability. For instance, as seen from the embodiments described hereinafter, a solution of highly polymerized silicic acid of which the Na concentration has been reduced to about 0.1% does not gel even after being stored for about eighteen months with an $SiO_2$ concentration of about 9% and still has a very high coagulating capability. It has been found that, for the purposes of the invention, the concentration of alkali metal in the solution should not be more than about 0.3%. The concentration of $SiO_2$ in the silicic acid solution of the invention can be increased to greater than about 15% without losing its high stability by using a condensing apparatus such as a rotary evaporator.

As described in U.S. Pat. No. 4,923,629, it is desirable that the solution of highly polymerized silicic acid have a limiting viscosity of not less than about twice that of silicic acid monomer (that is, about 0.2(100ml/g)) in order to have a high coagulating capability as a main flocculant. Further, as with the flocculant described in the above patent, the silicic acid solution of the invention is usually used as a flocculant together with a small amount of a metal salt which is capable of forming a hydroxide in water such as aluminum sulphide or ferric chloride. For the purpose of further increasing the stability, a metal salt which is capable of generating ferric ion in the solution, such as ferric sulphide, ferric chloride or ferric nitrate, is preferred. The use of ferric nitrate is found to be especially desirable.

A preferred method for producing the flocculant of the invention is as follows:

A raw material of an alkali metal silicate such as sodium silicate or potassium silicate is subjected to a treatment to remove alkali metal. At this stage, it is not essential to adjust the concentration of $SiO_2$ in the starting material to a high concentration such as 8%, although it is preferred.

Ordinarily, the treatment to remove alkali metal is carried out either by adding an ion exchange resin to the solution and removing it therefrom by filtration after stirring or by passing the solution of alkali metal silicate through a bed of ion exchange resin. By this treatment, a large portion of alkali metal such as sodium or potassium in the solution is removed, and a solution of silicic acid in which the concentration of alkali metal is extremely low can be obtained. It is preferred to adjust the concentration of alkali metal in the solution to not more than 0.3%.

The solution of low alkali metal concentration thus obtained is once brought to a gel condition and, thereafter, brought again to a solution condition by allowing it to stand. This is an important step for obtaining the flocculant of the invention because it has been found that only a silicic acid solution of extremely low alkali metal concentration can be made into an effective flocculant through this liquefication step. A silicic acid solution having a higher concentration of alkali metal can no longer be made into an effective flocculant after it gels.

In order to make the time of the step for gelation and liquefication of the silicic acid solution shorter, it is desirable to adjust the pH of the solution to a range close to neutrality, for instance, a pH of about 6–10. Therefore, when the solution of low alkali metal concentration obtained by the treatment for removing alkali metal has a low pH, it is preferred to add a small amount of an alkaline agent such as NaOH to the solution for the purpose of pH adjustment. The addition of a small amount of alkaline agent such as NaOH for the purpose of pH adjustment does not substantially affect the concentration of alkali metal.

Thus, the gel of silicic acid solution of low alkali metal concentration is again converted to a liquid. For faster liquefication of the gel, it is preferred that the gel be allowed to stand for about 24 hours at a temperature of about 60° C. The viscosity of the solution obtained by liquefication is preferably adjusted so that it has a limiting viscosity of not less than 0.2(100 ml/g). Further, if the concentration of $SiO_2$ in the solution is still low, the solution is concentrated by using a condensing apparatus such as a rotary evaporator so that the $SiO_2$ concentration becomes not less than 8%.

By the above process, there can be obtained a solution of silicic acid which has a high $SiO_2$ concentration, a high limiting viscosity and an extremely low concentration of alkali metal. Usually, a small-amount of metal salt capable of forming a hydroxide in water such as ferric chloride, ferric nitrate or aluminum sulphide is further added to this solution and the solution is used as a flocculant for water treatment.

The foregoing and other objects, features and advantages of the present invention will be understood more clearly and fully from the following detailed description of preferred embodiments.

DETAILED DESCRIPTION OF PREFERRED EMBODIMENTS

EXAMPLE 1

100 g of an aqueous solution of "Class 3 water glass", of which the $SiO_2$ concentration was adjusted to 8.6% by weight, was mixed with 100 g of an "H type" cation exchange resin and stirred for 5 minutes. After stirring and removing the cation exchange resin by filtration, 60 g of a silicic acid solution having an Na concentration of 0.02% by weight was obtained.

The pH of the solution was adjusted to 8.8 by adding 2 ml of 1N—NaOH thereto and stirring. The viscosity of the solution rapidly increased and the solution set to a gel at about 30 seconds after adding the NaOH.

The gel was again converted to a liquid by allowing it to stand for 24 hours in a vessel the inside temperature of which was maintained at 60° C. By the liquefication, a solution of highly polymerized silicic acid having a 7.9% $SiO_2$ concentration and 0.10% Na concentration was obtained. The limiting viscosity and mean molecular weight of the solution were determined by using a Ubbelohde viscosity meter and a molecular-weight fractionation method with ultrafilters, respectively. The limiting viscosity was 0.29(100 ml/g) and the mean molecular weight was about 280,000 (g/mol).

EXAMPLE 2

100 g of an aqueous solution of "Class 3 water glass", of which the $SiO_2$ concentration was adjusted to 9.0%, was mixed with 200 g of an "H Type" cation exchange resin and stirred for 5 minutes. After stirring and removing the cation exchange resin by filtration, 90 g of a silicic acid solution having a 9.0% $SiO_2$ concentration and 0.01% Na concentration by weight was obtained. The pH of the solution was adjusted to 8.8 by adding 3.0 ml of 1N—NaOH thereto and stirring. The solution set to a gel at 30 sec. after adding the NaOH. The gel was liquefied by allowing it to stand for 24 hr. in a vessel the inside temperature of which was maintained at 60° C.

The solution obtained by the above liquefication of gel was further stored in a vessel the inside temperature of which was kept at 20° C. for 18 months. It was determined by the same methods as in Example 1 that the $SiO_2$ concentration, Na concentration, limiting viscosity and mean molecular weight of the solution stored for 18 months were respectively as follows:

| | |
|---|---|
| $SiO_2$ | 8.7% |
| Na concentration | 0.084% |
| Limiting viscosity | 0.27 (100 ml/g) |
| Mean molecular weight | about 270,000 (g/mol) |

EXAMPLE 3

2 kg of an aqueous solution of "Class 3 water glass", of which the $SiO_2$ concentration was adjusted to 8.6%, was mixed with 2 kg of an "H type" cation exchange resin and stirred for 5 minutes. After stirring and removing the cation exchange resin by filtration, 1.8 kg of a silicic acid solution having a 0.02% Na concentration and 8.0% $SiO_2$ concentration was obtained. 60 ml of 1N—NaOH was added to the solution for the purpose of pH adjustment. The solution set to a gel at 30 sec. after adding NaOH. The gel was liquefied by allowing it to stand for 24 hours in a vessel the inside temperature of which was maintained at 60° C. The silicic acid solution thus obtained by the liquefication was further concentrated by using a rotary evaporator to increase the concentration 2.5 times. (The rotary evaporator was operated at 75° C., 40 rpm and 20–150 mmHg.)

The $SiO_2$ concentration, Na concentration, limiting viscosity and mean molecular weight of the silicic acid solution after being concentrated were determined to be as follows:

| | |
|---|---|
| $SiO_2$ concentration | 18.8% |
| Na concentration | 0.26% |
| Limiting viscosity | 0.28 (100 ml/g) |
| Mean molecular weight | about 280,000 (g/mol) |

EXAMPLE 4

1 kg of an aqueous solution of "Class 3 water glass", of which the $SiO_2$ concentration was adjusted to 4.3%, was passed through a bed having a height of 32 cm of an "H type" cation exchange resin which was disposed in a filter cylinder having an inside diameter of 5 cm. with a passing rate of 2 m/hr. 900 g of filtrate having an $SiO_2$ concentration of 3% and an Na concentration of 0.004% was obtained. To the filtrate was added 8 ml of 1N—NaOH with stirring by using a magnetic stirrer so that the pH was adjusted to 8.8%. The solution was allowed to stand at a temperature of 20° C. The viscosity of the solution gradually increased, and the solution set to a gel at 13 hours after the start of standing. The gel was liquefied by further allowing it to stand for 24 hours in a vessel the inside temperature of which was maintained at 60° C. The liquefied solution was concentrated by using a rotary evaporator to increase the concentration two times. (The rotary evaporator was operated at 75° C., 40 rpm and 20–150 mmHg.)

The $SiO_2$ concentration, Na concentration, limiting viscosity and mean molecular weight of the concentrated solution were determined to be as follows:

| $SiO_2$ concentration | 8.6% |
|---|---|
| Na concentration | 0.048% |
| Limiting viscosity | 0.23 (100 ml/g) |
| Mean molecular weight | about 260,000 (g/mol) |

EXAMPLE 5

500 g of an aqueous solution of potassium silicate, of which the $SiO_2$ concentration was adjusted to 8.6%, was mixed with 500 g of "H type" cation exchange resin and stirred for 5 minutes by using a magnetic stirrer. Then, after removing the cation exchange resin by filtration, 14 ml of 1N—NaOH was added to the solution. The viscosity of solution rapidly increased and the solution gelled at 30 sec. after the addition of NaOH. The gel was liquefied by allowing it to stand for 24 hours in a vessel the inside temperature of which was maintained at 60° C.

The $SiO_2$ concentration, potassium concentration, limiting viscosity and mean molecular weight of the liquefied solution were determined to be as follows:

| $SiO_2$ concentration | 8.4% |
|---|---|
| K concentration | 0.076% |
| Limiting viscosity | 0.29 (100 ml/g) |
| Mean molecular weight | about 280,000 (g/mol) |

EXAMPLE 6

By combining the polymerized silicic acid obtained in Example 3 with three different metal salts (ferric chloride, ferric nitrate and ferric sulphide), twelve samples of flocculants having a total concentration of effective components ($SiO_2+Fe_2O_3$) of 10.0%, 12.5%, 15.0% or 17.5% were prepared as follows:

The solution of polymerized silicic acid prepared in Example 3 was divided into twelve samples (Samples 1 through 12). To each sample distilled water and metal salt were added. That is, ferric chloride was added to four samples of a first group (Samples 1 to 4), ferric nitrate was added to four samples of a second group (Samples 5 to 8) and ferric sulphide was added to four samples of a third group (Samples 9 to 12), so that the mol ratio of Si:Fe in each sample was 3:1.

EXAMPLE 7

The solution of polymerized silicic acid obtained in Example 5 was divided into three samples (Samples 13 to 15). To each sample was added distilled water and a different metal salt, that is, Sample 13 (ferric chloride), Sample 14 (ferric nitrate) and Sample 15 (ferric sulphide), so that the mol ratio of Si:Fe and the total concentration of effective components ($SiO_2+Fe_2O_3$) in each sample was 3:1 and 10%, respectively.

EXAMPLE 8 (FOR COMPARISON)

Three samples for comparison were prepared by using a highly polymerized silicic acid solution which was not subjected to a treatment to remove alkali metal and has a high total concentration of effective components, as follows:

640 g of an aqueous solution of "Class 3 water glass", of which the $SiO_2$ concentration was adjusted to 11.0%, was mixed with 160 ml of 5.4N—HCl with stirring. 800 g of a silicic acid solution having a pH of 2.0 and $SiO_2$ concentration of 8.8% was obtained. The solution was polymerized by slowly stirring for 30 minutes in a vessel the temperature of which was maintained at 60° C. A solution of polymerized silicic acid having a limiting viscosity of 0.30(100 ml/g) and a mean molecular weight of about 350,000 (g/mol) was obtained.

The silicic acid solution thus obtained, of which the Na concentration was not reduced, was divided into three samples (Samples 16 to 18). To each sample was added a different metal salt, that is, Sample 16 (ferric chloride), Sample 17 (ferric nitrate) and Sample 18 (ferric sulphide), so that the mol ratio of Si:Fe in each sample was 3:1 and the total concentration of effective components ($SiO_2+Fe_2O_3$) was 10%.

TEST EXAMPLE 1

Eighteen samples of flocculants (Samples 1 through 18) prepared in Example 6, Example 7 and Example 8 were subjected to a test for their determining gel times by keeping them in two vessels the temperatures of which were maintained constant at 60° C. and 20° C., respectively.

The result of the test is mentioned in Table 1.

TABLE 1

| Sample No. | Added Salt | Mol. Ratio (Si:Fe) | Con. (%) ($SiO_2 + Fe_2O_3$) | pH | Gel Time (hr.) (60° C.) | Gel Time (hr.) (20° C.) |
|---|---|---|---|---|---|---|
| 1 | $FeCl_3$ | 3:1 | 10.0 | 1.5 | 110 | 8800 |
| 2 | " | " | 12.5 | 1.3 | 95 | 6000 |
| 3 | " | " | 15.0 | 1.3 | 50 | 2650 |
| 4 | " | " | 17.5 | 1.2 | 30 | 1100 |
| 5 | $Fe(NO_3)_3$ | " | 10.0 | 1.1 | 360 | >12000 |
| 6 | " | " | 12.5 | 0.9 | 190 | 8800 |
| 7 | " | " | 15.0 | 0.8 | 90 | 3850 |
| 8 | " | " | 17.5 | 0.6 | 48 | 2400 |
| 9 | $Fe(SO_4)_3$ | " | 10.0 | 1.3 | 35 | 1100 |
| 10 | " | " | 12.5 | 1.1 | 20 | 120 |
| 11 | " | " | 15.0 | 1.0 | 10 | 50 |
| 12 | " | " | 17.5 | 0.9 | 8 | 25 |
| 13 | $FeCl_3$ | " | 10.0 | 1.4 | 95 | >4300 |
| 14 | $Fe(No_3)_3$ | " | " | 1.1 | 240 | >4300 |
| 15 | $Fe(SO_4)_3$ | " | " | 1.3 | 35 | 1100 |
| 16 | $FeCl_3$ | " | 10.0 | 1.5 | 2 | 30 |
| 17 | $Fe(NO_3)_3$ | " | " | 1.1 | 4 | 50 |
| 18 | $Fe(SO_4)_3$ | " | " | 1.3 | 0.5 | 6 |

As can be seen from Table 1, the flocculants of the invention containing the silicic acid solution which was subjected to the treatment for removing alkali metal (Samples 1 to 15) showed excellent stability where the total concentration of effective components was 10% or more, while the flocculants containing the silicic acid solution which was not subjected to such an alkali metal removing treatment (Samples 16 to 17) had gel times of not more than several tens of hours at 20° C. when the concentration of effective components was 10%. Especially, the flocculants of the invention which contain FeCl₃ or Fe(NO₃)₃ as a metal salt remained stable without gelling for about 1000 to 4000 hours at 20° C. even when the total concentration of effective components was in a very high range such as 15.0 to 17.5%

Then, the flocculants of Samples 1 to 15 were subjected to jar tests, for the purpose of confirming the coagulating capability, as follows:

Each sample of flocculant was poured with stirring into test water having a turbidity of 100 degrees, alkalinity of 60 mg/l (as $CaCO_3$) and a pH of 7.5 which was prepared by adding kaolin and $NaHCO_3$ to distilled water. The flocculant was used at a rate of 2.0 mg/l as Fe and stirred for 7 minutes at a speed of 120 rpm (at starting) and 30 rpm (at 3 minutes after starting). The time when flocs appeared after the start of stirring, the average size of flocs and the turbidity of the treated water are shown in Table 2.

TABLE 2

| Sample No. | Floc Appearance Time (sec.) | Average Floc Size (mm) | Water Turbidity (degree) |
|---|---|---|---|
| 1 | 30 | 2.0–5.0 | 0.6 |
| 2 | 30 | 2.0–5.0 | 0.8 |
| 3 | 30 | 2.0–5.0 | 0.6 |
| 4 | 30 | 2.0–5.0 | 0.8 |
| 5 | 30 | 2.0–5.0 | 0.6 |
| 6 | 30 | 2.0–5.0 | 0.8 |
| 7 | 30 | 2.0–5.0 | 0.8 |
| 8 | 30 | 2.0–5.0 | 0.7 |
| 9 | 30 | 2.0–5.0 | 0.7 |
| 10 | 30 | 2.0–5.0 | 0.8 |
| 11 | 30 | 2.0–5.0 | 0.6 |
| 12 | 30 | 2.0–5.0 | 0.8 |
| 13 | 30 | 2.0–5.0 | 0.7 |
| 14 | 30 | 2.0–5.0 | 0.9 |
| 15 | 30 | 2.0–5.0 | 0.6 |

As can be seen from Table 2, it was confirmed that the flocculants of the invention showed excellent results in each of floc appearance time, floc size and water turbidity after treatment.

TEST EXAMPLE 2

The flocculant obtained in Example 2 which was stored for 18 months after preparation was subjected to a jar test for confirming its coagulating capability after long term storage, as follows:

100 g of a flocculant of which the mol ratio of Si:Fe was 3:1 and the total concentration of effective components ($SiO_2+Fe_2O_3$) was 10%, was prepared by adding 10.4 g of ferric chloride ($FeCl_3.6H_2O$) and water to the solution of polymerized silicic acid obtained in Example 2.

The flocculant was poured into a test water having a turbidity of 100 degrees, an alkalinity of 60 mg/l (as $CaCO_3$) and a pH of 7.5, which was prepared by adding kaolin and $NaHCO_3$ to distilled water. The pouring rate of flocculant was 20 mg/l as Fe and stirring was carried out for 7 minutes at a rate of 120 rpm (at starting) and 30 rpm (3 minutes after starting). The floc appearance time, the average floc size and the turbidity of treated water at 5 minutes after the stop of stirring were as follows:

| Floc Appearance time | 30 (sec) |
| Average floc size | 2.0–5.0 (mm) |
| Turbidity of treated water | 0.6 (degree) |

Thus, it was confirmed that the flocculant prepared in Example 2 and stored for 18 months also has excellent coagulating capability.

TEST EXAMPLE 3

A test was carried out for the purpose of confirming the coagulating capability of a flocculant which comprises a polymerized silicic acid solution prepared by a process in which the addition of an alkaline agent for the purpose of adjusting pH was not made, as follows:

100 g of an aqueous solution of "Class 3 water glass", of which the concentration of $SiO_2$ was 8.6%, was mixed with 50 g of an "H type" cation exchange resin and stirred for 5 minutes with a magnetic stirrer. 90 g of silicic acid solution having an 8.6% $SiO_2$ concentration, 0.14% Na concentration and pH of 9.3, was obtained by removing the cation exchange resin by filtration after the finish of stirring. The obtained solution gelled after about 10 minutes, at a room temperature of 20° C. The gel was liquefied by allowing it to stand for 24 hours in a vessel the inside temperature of which was constantly maintained at 60° C. The solution of polymerized silicic acid thus obtained had a limiting viscosity of 0.23(100 ml/g) and a mean molecular weight of about 240,000.

100 g of a flocculant of which the mol ratio of Si:Fe was 3:1 and the total concentration of effective components ($SiO_2+Fe_2O_3$) was 10%, was prepared by adding 10.4 g of ferric chloride ($FeCl_3.6H_2O$) and water to 80.6 g of the above solution of polymerized silicic acid.

The coagulating capability of the flocculant was determined by a jar test. Namely, the flocculant was poured into a test water having 100 degrees of turbidity, 60 mg/l(as $CaCO_3$) of alkalinity and a pH of 7.5 prepared by adding kaolin and $NaHCO_3$ to distilled water, and stirred. The rate of pouring of the flocculant was 2.0 mg/l and the stirring was carried out for 7 minutes at a rate of 120 rpm (at the start) and 30 rpm (at 3 minutes after starting). The floc appearance time, the average floc size and the turbidity of the treated water were as follows:

| Floc appearance time | 30 (sec) |
| Average floc size | 2.5–5.0 (mm) |
| Water turbidity | 0.8 (degree) |

Thus, it was confirmed that the flocculant prepared by the above process has excellent coagulating capability.

TEST EXAMPLE 4

The following test was carried out for the purpose of clarifying the variation of characteristics of the polymerized silicic acid solution when the alkali metal concentration in the solution is varied.

2 kg of an aqueous solution of "Class 3 water glass", of which the $SiO_2$ concentration was adjusted to 9.0%, was subjected to treatment to remove alkali metal by mixing it with 3 kg of an "H type" cation exchange resin and stirring for 5 minutes.

After removing the cation exchange resin by filtration, 1.8 kg of a silicic acid solution having a 9.0% $SiO_2$ concentration and 0.01% Na concentration was obtained. The solution was divided into 11 samples. After adding different amounts of sodium hydrate to each sample, their pH, $SiO_2$ concentration and Na concentration were determined. The samples were allowed to stand at room temperature of 20° C. to determine their gel time. Eight samples gelled within 30 minutes and three samples did not gel even after a lapse of 24 hours. Both the gels and the solutions which did not gel were further allowed to stand for 24 hours in a vessel the temperature of which was maintained constant at 60° C. After the lapse of 24 hours from the start of standing at 60° C., it was observed that the eight gel samples had converted to a liquid and the other three solution samples set to gel. The liquefied samples were analyzed to determine their limiting viscosity and mean molecular weight. The results are shown in Table 3.

TABLE 3

| Sample No. | $SiO_2$ con. (%) | Na con. (%) | GEL time at 20° C. (min.) | Condition after 24 hr at 60° C. | Limiting Vis. (100 ml/g) | Mean mol. Weight (g/mol) |
|---|---|---|---|---|---|---|
| 1 | 8.6 | 0.041 | 1 | solution | 0.48 | 640000 |
| 2 | 8.6 | 0.051 | 1 | solution | 0.42 | 580000 |
| 3 | 8.6 | 0.062 | 1 | solution | 0.37 | 500000 |
| 4 | 8.6 | 0.108 | 1 | solution | 0.23 | 260000 |
| 5 | 8.6 | 0.154 | 10 | solution | 0.21 | 220000 |
| 6 | 8.6 | 0.185 | 10 | solution | 0.20 | 200000 |
| 7 | 8.6 | 0.200 | 30 | solution | 0.18 | 170000 |
| 8 | 8.6 | 0.291 | 30 | solution | 0.14 | 90000 |
| 9 | 8.6 | 0.449 | not gelled in 24 hr | gel | — | — |
| 10 | 8.6 | 0.514 | not gelled in 24 hr | gel | — | — |
| 11 | 8.6 | 0.980 | not gelled in 24 hr | gel | — | — |

As seen from Table 3, it was observed that the solutions having an Na concentration exceeding about 0.3% did not show the characteristic of converting from a gel to a liquid necessary for the present invention.

It should be understood that, although the preferred embodiments of the present invention have been described herein in considerable detail, certain modifications, changes, and adaptations can be made by those skilled in the art and that it is hereby intended to cover all modifications, changes and adaptations thereof falling within the scope of the appended claims.

What is claimed is:

1. A flocculant for water treatment comprising:
    a solution of highly polymerized silicic acid and a water soluble salt of a metal capable of forming a hydroxide in water,
    said solution having an $SiO_2$ concentration of not less than about 8%, a limiting viscosity of not less than about 0.2(100 ml/g), and an alkali metal concentration of not more than about 0.3%.

2. The flocculant for water treatment of claim 1, wherein the water-soluble salt of a metal capable of forming a hydroxide in water is selected from the group consisting of ferric nitrate, ferric chloride and ferric sulphide.

* * * * *

UNITED STATES PATENT AND TRADEMARK OFFICE
CERTIFICATE OF CORRECTION

PATENT NO.  : 5,415,808
DATED       : May 16, 1995
INVENTOR(S) : HASEGAWA et al.

It is certified that error appears in the above-identified patent and that said Letters Patent is hereby corrected as shown below:

On the Title page, Item [30], the priority date "Oct. 1, 1990" should read -- Jan. 10, 1990--.

Signed and Sealed this

First Day of August, 1995

*Attest:*

*Attesting Officer*

BRUCE LEHMAN

*Commissioner of Patents and Trademarks*